US009568922B2

(12) United States Patent
Scherer et al.

(10) Patent No.: US 9,568,922 B2
(45) Date of Patent: Feb. 14, 2017

(54) ELECTROMAGNETIC PRESSURE VALVE

(75) Inventors: Georg Scherer, Kirchheim (DE);
Helmut Mang, Memmingen (DE);
Florian Schreiber, Kadeltshofen (DE)

(73) Assignee: FIRMA SVM SCHULTZ VERWALTUNGS-GMBH & CO. KG, Memmingen (DE)

( * ) Notice: Subject to any disclaimer, the term of this patent is extended or adjusted under 35 U.S.C. 154(b) by 519 days.

(21) Appl. No.: 13/479,865

(22) Filed: May 24, 2012

(65) Prior Publication Data

US 2012/0298898 A1    Nov. 29, 2012

(30) Foreign Application Priority Data

May 27, 2011  (DE) .................. 10 2011 103 846

(51) Int. Cl.
*F16K 11/07*     (2006.01)
*G05D 16/20*     (2006.01)

(52) U.S. Cl.
CPC .... *G05D 16/2033* (2013.01); *Y10T 137/87708* (2015.04)

(58) Field of Classification Search
CPC .. F16D 48/02; F16K 31/0634; G05D 16/2013;
G05D 16/2033; Y10T 137/87209; Y10T 137/87217; Y10T 137/8667; Y10T 137/86678; Y10T 137/86614; Y10T 137/86622; Y10T 137/86574; Y10T 137/87708
USPC .......... 137/596.16, 596.17, 625.25, 625.26, 137/625.64, 625.2, 625.65; 251/129.14, 129.17, 251/129.21; 335/279, 281

See application file for complete search history.

(56) References Cited

U.S. PATENT DOCUMENTS

| | | | | |
|---|---|---|---|---|
| 3,527,253 A | * | 9/1970 | Harpman | 137/625.27 |
| 3,661,183 A | * | 5/1972 | Komaroff et al. | 137/625.65 |
| 4,050,477 A | * | 9/1977 | Acar | 137/625.65 |
| 4,250,922 A | * | 2/1981 | Will | F16K 31/0613 137/116.3 |
| 4,624,285 A | * | 11/1986 | Perach | 137/625.65 |
| 4,662,605 A | * | 5/1987 | Garcia | F16K 31/0613 137/14 |
| 4,744,389 A | * | 5/1988 | Ichihashi | 137/625.65 |

(Continued)

FOREIGN PATENT DOCUMENTS

WO   WO 2009092488 A1 * 7/2009

OTHER PUBLICATIONS

Patent Translate Description WO 2009/092488, Moosman, et al., Pressure Control Valve, Jul. 30, 2009, machine translation retrieved from EPO Espacenet website on Sep. 25, 2014.*

*Primary Examiner* — Craig J Price
(74) *Attorney, Agent, or Firm* — Goodwin Procter LLP

(57) ABSTRACT

The invention refers to an electromagnetic valve, in particular pressure control valve, with a magnetic part of at least an electrically controllable coil, a core and an armature provided in an armature housing and shiftably guided, and with a valve part, having at least a feed, a return and/or a consumer connection, wherein the valve part has between the feed and the return or consumer connection at least one globe valve that can be sealed by a locking part, and the armature interacts with the locking part, between armature and locking part an activation rod arranged in a penetration bore hole of the core being provided for this purpose, wherein a connecting channel, connecting the penetration bore hole with an in particular pressure-free or pressure-reduced relieving area, ends in the penetration bore hole.

25 Claims, 4 Drawing Sheets

(56) References Cited

U.S. PATENT DOCUMENTS

| | | | |
|---|---|---|---|
| 4,966,195 A * | 10/1990 | McCabe | 137/625.64 |
| 5,191,827 A * | 3/1993 | Kervagoret | B60T 8/3665 |
| | | | 137/596.17 |
| 5,259,414 A * | 11/1993 | Suzuki | 137/625.65 |
| 5,853,028 A * | 12/1998 | Ness et al. | 137/625.65 |
| 6,328,065 B1 * | 12/2001 | Schmid | G05D 16/2013 |
| | | | 137/596.17 |
| 6,397,891 B1 * | 6/2002 | Neuhaus | G05D 16/2013 |
| | | | 137/625.65 |
| 6,498,416 B1 * | 12/2002 | Oishi et al. | 310/214 |
| 6,538,543 B2 * | 3/2003 | Bircann et al. | 251/129.15 |
| 6,547,215 B2 * | 4/2003 | Matsusaka et al. | 251/129.15 |
| 6,601,822 B2 * | 8/2003 | Tachibana et al. | 251/129.15 |
| 6,719,006 B2 * | 4/2004 | Fleischer et al. | 137/596.17 |
| 6,796,322 B2 * | 9/2004 | Sen | 137/82 |
| 6,904,934 B2 * | 6/2005 | Runge | G05D 16/2013 |
| | | | 137/596.17 |
| 7,028,980 B2 * | 4/2006 | Kokubu et al. | 251/129.15 |
| 7,137,411 B2 * | 11/2006 | Golovatai-Schmidt et al. | 137/625.65 |
| 7,458,561 B2 * | 12/2008 | Oishi | 251/337 |
| 7,481,242 B2 * | 1/2009 | Golovatai-Schmidt | 137/625.65 |
| 7,516,756 B2 * | 4/2009 | Mayr | F16D 48/02 |
| | | | 137/596.17 |
| 7,726,329 B2 * | 6/2010 | Armiroli | F02M 59/366 |
| | | | 123/511 |
| 8,205,857 B2 * | 6/2012 | Schmid et al. | 137/625.65 |
| 8,641,011 B2 * | 2/2014 | Scherer et al. | 251/129.17 |
| 8,701,707 B2 * | 4/2014 | Moosmann et al. | 137/596.17 |
| 8,791,780 B2 * | 7/2014 | Boban et al. | 335/281 |
| 9,052,723 B2 * | 6/2015 | Mayr | G05D 16/2013 |
| 2002/0134228 A1 * | 9/2002 | Fleischer et al. | 91/459 |
| 2004/0060604 A1 * | 4/2004 | Uemura | F04B 27/1804 |
| | | | 137/595 |
| 2005/0218362 A1 * | 10/2005 | Furuta et al. | 251/129.15 |
| 2005/0274336 A1 * | 12/2005 | Wagner | F16K 31/0637 |
| | | | 123/90.12 |
| 2010/0282991 A1 * | 11/2010 | Okamoto | F16K 31/0655 |
| | | | 251/129.15 |
| 2015/0179322 A1 * | 6/2015 | Irie | H01F 3/00 |
| | | | 335/281 |

* cited by examiner

ELECTROMAGNETIC PRESSURE VALVE

BACKGROUND OF THE INVENTION

The invention refers to an electromagnetic valve with a magnetic part and a valve part having at least a feed, a return and/or a consumer connection, and wherein between the feed and the return or consumer connection at least one globe valve is provided that can be sealed by a locking part, and wherein the armature interacts with the locking part via an activation rod, and the activation rod is arranged in a penetration bore hole of the core.

BRIEF SUMMARY OF THE INVENTION

The pressure control valve of this type is employed in particular in transmission controls. The focus is here on a use in automatic transmissions, however, also conventional manual transmissions have pressure control valves of this kind. The pressure control valves in transmission controls are operated with transmission oil. Because of wear abrasion of transmission components, for example of clutch plates or toothed wheels or because of residue dirt from the production of the components or assembly, the transmission oil is soiled by dirt particles. These dirt particles often consist of magnetic materials or they contain such parts.

As the activation rod connecting the armature with the locking part is moved in the valve part of the pressure control valve filled with transmission oil, sometimes also soiled transmission oil, during the motion of the activation rod transmission oil will get in the magnetic part of the electromagnetic valve. Together with this input of transmission oil, inevitably also dirt particles get in the interior of the magnet. This input can lead to function errors or function interferences of the magnet or the entire electromagnetic valve because of the magnetic properties of the introduced dirt particles.

A separation of magnetic part and valve part is attempted by providing special sealings at the penetration opening and the activation rod, respectively. Another separation of magnetic part and valve part is attempted by fitting a thin ram with minimum free play in the magnetic part to minimize such the access of oil to the magnetic space by a gap seal.

Because of the high activation frequency and the connected pressures, however, these measurements cannot or can hardly prevent transmission oil and thus dirt particles from intruding or flowing in the interior of the magnetic part.

It is the objective of the present invention to reduce an impingement of the magnetic part of an electromagnetic valve with transmission oil or particles contained therein.

This problem is solved by an electromagnetic valve developed accordingly.

This electromagnetic valve, that is in particular a pressure control valve or a proportional pressure valve, has a magnetic part of at least one electrically controllable coil, a core and an armature provided in an armature housing, guided shifting. The valve need not be a pressure control valve. Instead also a control valve or another valve that can be configured in a suitable way, can be used.

The electromagnetic valve furthermore has a valve part having at least a feed, a return and/or a consumer connection. In the valve part between the feed and the return or the consumer connection at least one, preferably two globe valve(s) is/are provided that each can be sealed by a locking part. The armature provided in the armature housing that can be guided shifting interacts here with the locking member. This is performed via an activation rod provided between armature and locking part. For this, the activation rod protrudes from the armature housing, and penetrates the core of the magnetic part. For this, in the core a penetration bore hole is provided in which the activation rod is arranged, and through which the activation rod is guided. The electromagnetic valve according to the invention is characterized in that a connecting channel ends in the penetration bore hole. Via this connecting channel the penetration bore hole is connected with an in particular pressure-free or pressure-reduced relieving area.

The embodiment of the electromagnetic valve according to the invention has the advantage, that because of the pressure reduction or pressure discharge, that can be reached by the connecting channel, in the area of the core or the penetration bore hole the pressure-conditioned intruding of transmission oil in the armature housing is reduced, if not stopped completely. Oil that is introduced by the activation rod or introduced in the penetration bore hole, as well as contained dirt particles are introduced on their way to the armature housing in the pressure-free or pressure-reduced relieving area that is a result of the connecting channel. Further introduction of oil or oil particle mixtures is thus stopped.

The suggested embodiment of the valve achieves that in a simple manner introduction of transmission oil and soiling particles into the armature housing is stopped. The effort for obtaining an increased sealing because of geometric adjustments of activation rod and penetration bore hole, and the thus increased effort for the production of the valve is thus not necessary. The valve configured according to the invention prevents or substantially reduces introduction of oil in all locking or end positions of the valve, as the connecting channel is arranged in the magnetic core, thus is permanently in contact with the penetration bore hole and the activation rod guided or moved in it. Further sealing measurements, for example at the exit of the activation rod out of the magnetic core or at the entrance of the activation rod in the interior of the magnetic core are therefore not necessary or can be carried out less elaborately. The connecting channel arranged in the core can be designed in a simple way, for example by boring a pocket hole or a through bore hole penetrating the core for example vertically to its longitudinal axis. Besides the arrangement of the connecting channel carried out vertically or with a right angle or radially to the longitudinal axis of the armature housing or vertically to the penetration bore hole, also an arrangement of the connecting channel inclined relative to the before mentioned elements can be provided. The pressure relieving or pressure-minimizing effect of the connecting channel remains intact in any case. Additionally, the geometric particularities of the electromagnetic valve can be taken into account here, and passing on of the transmission oil flushed or introduced in the connecting channel is substantially improved or made simpler.

In an embodiment seen as favorable several connecting channels are provided. Here, two or more connecting channels can be provided extending radially to the penetration bore hole. The connecting channels are here arranged preferably opposite, crosswise or starlike.

As core or magnetic core according to the present invention is seen a separate structural part as well as an area, part area or section of the magnetic part or an area designed in one piece with the magnetic part, part area or section of the magnetic part arranged preferably between the armature housing and the valve part and/or extends each time in the direction of the valve part or projects therein.

In a preferred development of the invention it is defined that the core and/or the magnetic part or the core part or core section or the area or section or part of the magnetic part projecting in the valve part, is formed of two or more parts, separated in particular in axial direction, or has an axial separation. Such an arrangement may make the forming of the connecting channel considerably easier, in particular, if the connecting channel has, for example, a helical shape, that means a shape differing from a straight bore hole. Here, in particular a rather long connecting channel can be an advantage for the desired result, namely a reduction of the introduced oil in the armature housing. Besides the suggested, advantageous axial division of the core or magnetic part, however, also a radial division of the core or magnetic part is provided in a modification of the invention.

The invention is not restricted to the number of the core parts or magnetic part sections, two or more may be provided.

In the parts recesses or grooves arranged radially to the penetration bore hole are provided forming the at least one connecting channel or the connecting channels. It is seen as favorable, if the at least one connecting channel or connecting channels is/are integrated in the parts. There is the option here of milling, cutting a recess or groove in the parts, or integrating them directly during manufacturing, for example in an injection-molding process. When the parts are assembled or connected, the connecting channel will occur or the connecting channels are formed by the corresponding recesses in the respective parts.

A development of the invention provides that the activation rod consists of two parts. Here, a first part is in active connection with the locking parts of the valve, while a second part of the activation rod is designed to be introduced in the penetration bore hole. First and second parts of the activation rod are here during and after, respectively, the assembly of the electromagnetic valve according to the invention in active connection and operate the electromagnetic valve. The core or the penetration bore hole provided there centers the activation rod.

An embodiment seen as favorable provides that the core, an area of the core or the magnetic part having the connecting channel or the connecting channels and/or facing the pressure space is configured as separate structural part. It can be provided here, that the core is formed directly by the magnetic part, alternatively, of course, there is the option of providing the core itself as element of the electromagnetic valve separated from the magnetic part, however, linked with it positive interlocking, and an area of this core having the connecting channel or the connecting channels, being configured as separate structural part. This embodiment has in particular advantages when the electromagnetic valves according to the invention are produced and mounted, as a separate structural part can be produced, for example in a simplified manufacturing process such as, for example, an injection molding or embossing process, and is assembled, connected with the actual (magnetic) core or magnetic part in the electromagnetic valve only during mounting.

In order to predefine an assembly direction or assembly position of the separate structural part, or to simplify mounting and adjusting considerably, it is provided that the magnetic part or a magnetic part section of the magnetic part or the magnetic part section that can be brought into engagement with the separate structural part or the core, has a centering pin 26 or a centering bore hole for the centered assembly of the separate structural part. When the electromagnetic valve is mounted, a recess corresponding with the centering pin 26 or the centering bore hole or a projection at the structural part is brought into engagement with the centering pin 26 or the centering bore hole, and thus a position orientated orientation of the separate structural part becomes possible. Of course, the configuration does not remain restricted to the arrangement of a single centering pin 26 or a single centering bore hole. Two or more centering pins or centering bore holes or their combinations can be provided. At the same time, this avoids errors during the assembly of the structural part.

Magnetic part, core and/or separate structural part can be formed preferably of different materials. Often it is seen here as favorable, if the separate structural part is formed of plastic material, in particular of a temperature, acid and/or oil resistant plastic material, preferably of polyphenylene sulfide, polyamide, polytetrafluor ethylene, polychlortrifluor ethylene or the like, as well as of their mixtures.

Alternatively or additionally, the separate structural part can have a coating of these plastic materials or their mixtures. Manufacturing from a plastic material has proved particularly advantageously, as the separate structural part can thus be manufactured rather economically in an injection-molded process. Other advantages appear in connection with the design of the separate structural part during the use of appropriate production processes, as the inner structures of the structural part, in particular the connecting channels provided there, are provided already during manufacturing in the separate structural part, and thus a finishing is not necessary.

Besides the already discussed option of configuring the connecting channel or the connecting channels as connecting channels running crosswise, starlike and/or extending radially to the penetration bore hole, another preferred embodiment of the invention provides that the connecting channels or the connection channel are/is provided as through bore hole(s) in the core or in the core part or core part section.

The at least one connecting channel can also have angulations or a bend. In the area of the at least one connecting channel in the core, a notch, bore hole or other recess can be provided in which the connection channel or the connection channels end(s). This achieves another reduction of the connected pressure because of the volume enlarged compared with the at least one connection channel. Also the notch, recess or bore hole in the core serves as reception, reception space or intermediate reservoir for the oil or oil particle mixture transported away from the penetration bore hole via the at least one connecting channel. The recess can be here adapted or formed or created such that it end again in a downstream drainage through which, for example, when the recess or the connecting channel or reservoir is filled completely, excess oil is transported again into the oil circuit. Besides, there is the option that there is a connection with the return through which the excreted oil or oil particle mixture gets again into the oil circuit.

A development provides that the at least one connecting channel ends in a groove or annular groove provided in a magnetic part projecting in the core and/or the valve part, and/or a housing receiving the core and/or the magnetic part, and the groove or annular groove again is in connection with a drainage or a bore hole. The oil or oil particle mixture excreted in the groove or annular groove is then transported away via this drainage or the bore hole from the core or magnetic part, and then removed from there from the electromagnetic valve according to the invention or guided back in an oil circuit.

The core of the magnetic part limits the armature housing towards the valve part, and serves as reception of the penetration bore hole and the arrangement of the connecting channel.

The pressure-free or pressure-reduced relieving area is conveniently integrated in the core or formed or limited by the core, a core part or a core part section. This offers the opportunity that effects according to the invention are achieved, without the requirement of adapting the housing or the valve part themselves. Relieving area and reception space for the excreted media are provided by the core, core part or core part section themselves. The geometry of the housing of the electromagnetic valve thus has not to be adapted.

With reference to its longitudinal extension, the core projects in the part of the valve part containing the return, and has a circumferential flow edge. The part projecting in the valve part forms at the same time the upper limit of the valve part. The pressure-free area is also integrated in the core. This is achieved by the fact that the core has a reduced circumference in the area of the connecting channel. The result is here a spacing with reference to the part of the valve part receiving the core part, that is available as pressure-free space or as filling space for the oil or oil particle mixture deposited in the connecting channel. It has proved advantageous, if the at least one connecting channel ends in the circumference reduction or the circumference groove.

Magnetic part and valve part are arranged axially to each other. The valve part forms here a sleeve-like or pot-like housing and encloses partly the core or core part or a protruding part thereof projecting in the valve part. The inner diameter of the pot-like housing can have here a whole circumference of a reduced diameter. At the same time, there is here the option that a reduction of circumference and material, respectively, is only provided in the outlet area of the connecting channel, to form here a reception space for the excreted oil.

The pressure-free or pressure-reduced relieving area or a reception space for the excreted oil or oil particle mixture is provided preferably in a section of a housing of the valve or a housing surrounding the valve, the housing receiving the core, core part or core part section or the magnetic part. Here, it is provided conveniently that the section of the housing receiving or projecting each time in the core, core part, core part section or the magnetic part, has a reduction of circumference or material in an outlet area of the at least one connecting channel. This again creates the pressure-reducing relieving area or a reception space. Alternatively, there is, of course, also the option that the relieving area itself is provided in the core or magnetic part, while the reception space for the oil or oil particle mixture is provided in the housing section, and thus the result is a synergetic effect.

An advantageous development of the electromagnetic valve provides that the valve part or a valve housing has an in particular pot-like designed reception area for the core and/or magnetic part or a section of the magnetic part or core projecting in the valve part or housing section.

There is a distance between the bottom of the pot-like reception area of the valve part and the part of the core, core part or core part section and/or the magnetic part projecting therein that provides the return. The distance can here not only provide the return, but also serve as reception space for the excreted oil or oil particle mixture. If this reception space is filled, the medium collected here can be transported to the return and be returned to the oil circuit. The return is preferably separated fluidly from the rest of the valve part by a first that can be closed by a locking part. The valve seat has here a seal interacting with the first locking part and thus seals in a first operating position of the valve the return against the rest of the valve.

In a second operating position of the valve, the first locking part can be fastened via a motion of the activation rod to the part of the magnetic part projecting in the valve part. The locking part is here configured such that it is in complete contact with the surface provided at the front side at the magnetic part projecting in the valve part, and seals the penetration bore hole, when the return is opened. A complete sealing, however, is not possible in this case either, so that here is the risk that oil or oil particle mixture intrudes in the penetration bore hole, and would advance to the armature housing, if no connection channel is provided stopping or draining the oil flow.

In a first operating position of the electromagnetic valve the feed is connected with a consumer as the activation rod acts on a second locking part, and produces a connection between consumer connection and feed. In a second operating position, the return is in an end position, because of the pulled-back activation rod, while the first locking part is lifted out of the valve seat because of the motion of the activation rod. This produces then the connection between consumer connection and return. Here the space between the magnetic part and the valve part is filled with oil, that may transport particles. The section of the activation rod guided in the space, thus is in contact with the oil present and is moistened with it. When the activation rod is moved and is further guided into the penetration bore hole, this oil adhering to the activation rod, is transported in the penetration bore hole. When the activation rod is moved further, the oil in the penetration bore hole is transported further in the direction of the armature housing and gets in the connecting channel. The connecting channel achieves a pressure reduction or complete removal of the otherwise prevailing pressure, so that the oil in the penetration bore hole cannot be pressurized further, what would push the oil in the armature housing. Additionally, the connecting channel also provides a reservoir for the oil adhering to the activation rod. At the edges forming between the connecting channel and the penetration bore hole additionally the oil adhering to the activation rod is wiped off. For this purpose, the edges have an appropriate advantageous geometry that favors wiping off of oil and/or oil particle mixture.

The invention valve is not restricted to pressure valves but also encompasses proportional pressure valves.

BRIEF DESCRIPTION OF THE SEVERAL VIEWS OF THE DRAWINGS

In the drawings the invention is shown schematically in particular in an embodiment. In the figures:

FIG. 1 a preferred embodiment of the electromagnetic valve according to the invention in a lateral sectional representation, FIG. 2 an embodiment of an electromagnetic valve, representing the state of the art, also in lateral sectional representation, FIG. 3a another preferred embodiment of the electromagnetic valve according to the invention in lateral sectional representation, FIG. 3b a section through the core along the line A-A in FIG. 3a, FIG. 3c a cross-section showing a right-angled connecting channel in accordance with some embodiments of the present invention, FIG. 3d a cross-section showing a bended connecting channel in accordance with some embodiments of the present invention, FIG. 3e a cross-section showing an angled or inclined connecting channel in accordance with some embodiments of the present invention, FIG. 4a a preferred embodiment of the electromagnetic valve according to the invention in lateral sectional representation, FIG. 4b a section through the core along the line A-A in FIG. 4a.

DETAILED DESCRIPTION OF PREFERRED EMBODIMENTS

In the figures identical or corresponding elements each are indicated by the same reference numbers, and therefore are, if not useful, not described anew.

Figure 1:
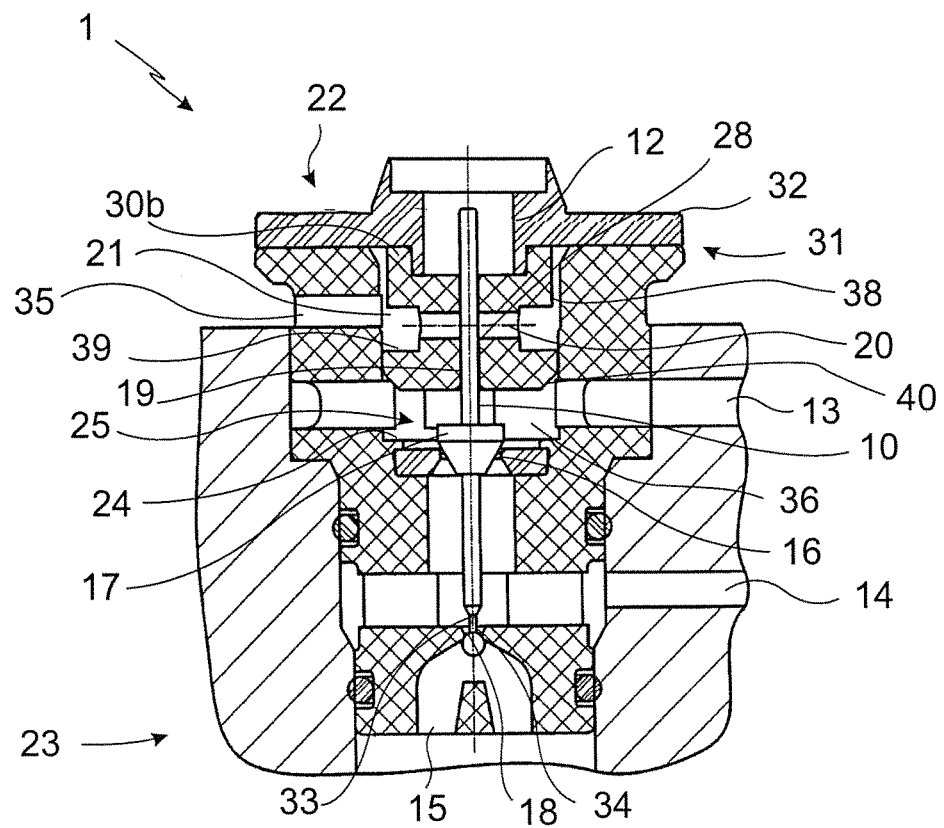

FIG. 1 is a possible embodiment of an electromagnetic valve 1. It consists of a valve part 23 and a magnetic part 22. Magnetic part 22 and valve part 23 are arranged coaxially to one another. The valve part 23 has in its area facing the magnetic part 22 a sleeve- or pot-like configuration in which the core 32 or a separate core part 30b protruding compared with the magnetic part is received. FIG. 1 only shows the bottom limitation part 31 of the magnetic part 22. The bottom part of the armature housing bore 12, in which the armature 11 is guided, can also be discerned. The rest of the magnetic part 22 has, in a conventional way, a coil former with a coil winded on the coil former in which the armature 11 is guided movably. FIG. 1 shows the core 32 facing the valve part 23. The term 32 comprises likewise a core part 30b and core part section 30a, respectively. If core part 30b and core part section 30a, respectively, have particular features or embodiments, these will be described separately. In the core 32 the penetration bore hole 19 is arranged through which an activation rod 10 linked or connected to the armature 11 is guided. The activation rod 10 connects the armature 11 with a first locking part 17 that is received in a first operating position of the electromagnetic valve 1 in a first valve seat 16. The activation rod 10 continues in axial direction of the valve part 23 and ends in a tappet 33 acting on a second locking part 18, configured in the embodiment as ball. Via the second valve seat 34, in which the second locking part 18 is received, a connection can be formed between the feed 15 and the consumer connection 14.

In a second operating position of the electromagnetic valve 1 the solenoid of the magnetic part is loaded with current, from which an armature movement results. The activation rod 10 connected with the armature is shifted in the same way. If the armature gets in its second maximum position (for example when the solenoid is completely electrified), the first locking part 17 is lifted out of the first valve seat 16. The first locking part 17 is lifted out of the first valve seat 16. At the same time, the connection between the tappet 33 and the second locking part 18 is removed, and the second locking part is pushed in the second valve seat 34 because of the flowing-in, pressurized fluid. This interrupts the connection of feed 15 and consumer connection 14. Instead, the first locking part 17 is lifted out of the first valve seat 16, and a connection between consumer connection 14 and return 13 is opened.

A third operating position of the electromagnetic valve 1 is characterized by the control of the pressure, where the activation rod 10 by the electrifying of the solenoid and, resulting from this, the position of the armature is positioned such, that the bottom second locking part 18 is lifted out of the valve seat 34 and is thus opened, and a controllable control of the pressure is carried out by the position of the first, in particular cone-like locking part 17 towards the first valve seat 16.

In the space 36 formed between the core 32 and the bottom 24 of the pot-like recess 25 in the valve part 23 there is, when the electromagnetic valve 1 according to the invention is operated, transmission oil, that may have been soiled by or loaded with particles. These particles can get through the penetration bore hole 19 in the armature housing bore 12. This happens, when the oil, in particular transmission oil, is pressurized because of the high pressures in the valve 1, and is pressed in the penetration bore hole 19. Besides, because of the oil adhering to the activation rod 10 that is operated with high frequency, during this movement of the activation rod 10 it will get in the penetration bore hole 19 and thus in the armature housing bore 12. In order to avoid this, a connecting channel 20 is provided in the embodiment of the valve 1 according to the invention, shown in FIG. 1. This connecting channel connects the penetration bore hole 19 with a relieving area 21 also provided in the core 32. Oil intruding in the core 32 through the penetration bore hole 19 that may be pressurized, advances to the connecting channel 20 in the penetration bore hole 19. This oil exits in the connecting channel 20 arranged vertically to the penetration bore hole 19. Additionally, the adhering oil is wiped off by the forming of the edge by the connecting channel 20 and the penetration bore hole 19.

In the core 32, the connecting channel 20 is arranged that produces the connection between the penetration bore hole 19 and a relieving area 21. This relieving area 21 is formed by the area of the valve part 23 enclosing the core 32. Besides, there is the option that the relieving area 21 is formed by appropriate recesses or notches or grooves in the section of the magnetic part 22 projecting in the valve part 23 or by a reduction of the circumference of the core 32 or a core part 30b or core part section 30a. It is also possible to form it by reducing the circumference (entirely or partly) of the valve part 23 and the core 32. Relieving area 21 is formed altogether, as it can be seen in FIG. 1, by the interaction of magnetic part 22 and valve part 23 or valve part 23 and core 32. The relieving area 21 is in connection with a bore hole opening to the outside, that means the side opposite the core 32. The oil or oil particle mixture transported via the penetration bore hole 19 or by the activation rod 10 advances to the connecting channel 20 during the operation of the electromagnetic valve 1, and is there removed from the activation rod 10 or wiped off from the activation rod 10, when the edge between the penetration bore hole 19 and the connecting channel 20 is formed appropriately. The edge 28, that can be configured, for example, ring-like or annularly, can have a suitable design or configuration or shape for this purpose.

After being wiped off, the oil is collected in the connecting channel 20. Oil that is pressed in the penetration bore hole because of the pressure prevailing in the valve 1, is also transported in the connecting channel 20. The connecting channel 20 with the linked relieving area 21 provides a pressure relieving, so that intruding oil advances only to the connecting channel 20. If the connecting channel 20 is filled with oil, it will exit the core 23 or the valve part 32 enclosing it through the bore hole 25, and can be returned in the oil circuit. In any case, the oil is drained by the penetration bore hole 19, and therefore does not get in the armature housing bore 12, where, because of the oil and the contained particles, respectively, otherwise the function of the solenoid could be interrupted.

In the embodiment, the connecting channel 20 is formed in the core 32 as through bore hole orientated radially to the penetration bore hole 19. The bore holes, two altogether in the embodiment, add up to a connecting channel 20 corresponding with the diameter of the core 32, exiting the core 32 on two sides.

Besides the here indicated arrangement of the connecting channel 20 orientated vertically or radially to the penetration bore hole 19, there is, of course, also the option of arranging it at an angle between 0 and 90° 20'(FIG. 3c), 20'" (FIG. 3e) compared with the penetration bore hole 19 inclined in the core 32. Also possible is an embodiment of the connecting channel 20" (FIG. 3d) with angulations or bends, to create a better connection at the bore holes 25, that may be provided at the valve part 23, or the like.

In the embodiment, the connecting channel 20 has a diameter-reduced area 38 widening in the direction of the groove 39 provided circumferential in the core 32. This widening forms a space 36 or a reception space for the deposited oil or oil particle mixture.

Besides the embodiment presented here, there is also the option of configuring the connecting channel 20 conically. In another embodiment, the connecting channel 20 can be configured with a continuously uniform diameter. Also, there is the option of adapting the groove 39 to the diameter of the connecting channel 20 in the groove width. The core 32, on the one hand, has the groove 39 cut in the core 32, and also, on the other hand, a diameter-reduced area that is joined thereto in the direction of the armature housing bore 12. This enlarges the relieving area 21 and additional space is created for reducing pressure and collecting oil, respectively. The core 32 widens again at the end of the core 32 located below the connecting channel 20 and facing the area between valve part and core 32, and takes altogether the diameter of the recess 25 provided in the valve part 23 for receiving the core 32. To make assembling easier, the core 32 has a chamfer 40. This favors additionally the flow conditions in the return 13, as here no protruding edges are provided that project in the direct flow fluid, that may have an unfavorable influence on the flow conditions in the return 13.

The embodiment of the valve according to the invention presented in FIG. 1 has the advantage that intruding of oil in the armature housing bore 12 can be stopped effectively, without the necessity of adding sealing measurements or adapting the geometric conditions of activation rod 10 and penetration bore hole 19. However, these are possible. Thus, for example, the diameter of the activation rod 10 can be reduced. It can then be adapted with minimum free play in the penetration bore hole 19 to reduce the oil access to the armature housing bore 12 further. Thus, oil can only advance to the connecting channel 20, however, is not transported into the armature housing bore 12. The connecting channel 20 is arranged in the embodiment as through bore hole, or as several, for example crossing or radially extending from the penetration bore hole 19 bore holes in the core 32 of the electromagnetic valve 1 (see FIGS. 3a, 3b, 4a, 4b).

Figure 2:
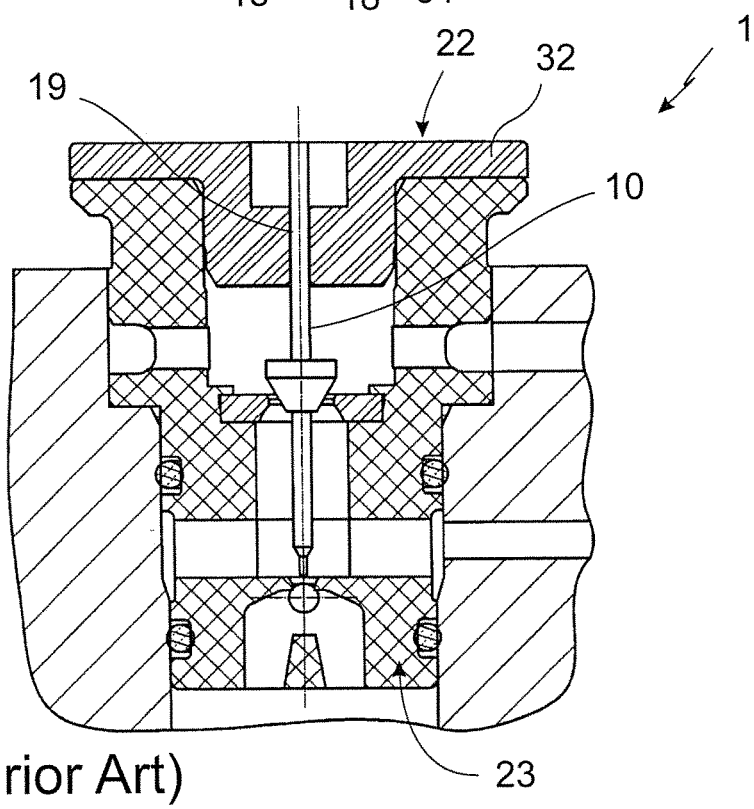

FIG. 2 shows the state of the art known so far. It can be seen here, that in the core 32 of the electromagnetic valve 1 no connecting channel 20 is provided. A sealing of the valve part 23 towards the magnetic part 22 is here achieved only by a gap seal that is formed by a thin tappet or a very thin activation rod 10 fitted with minimum free play in the magnetic part 22. A sealing effect of this kind is also possible in the embodiment shown in FIG. 1, additionally the oil flow is drained along the activation rod 10 in a pressure-free relieving area of the electromagnetic valve 1, that is formed by the connection channel 20 or is connected with it through the penetration bore hole 19. A transport in the armature housing bore 12 can thus be prevented, what has not been provided so far in the state of the art, and therefore develops it advantageously.

Figure 3A:
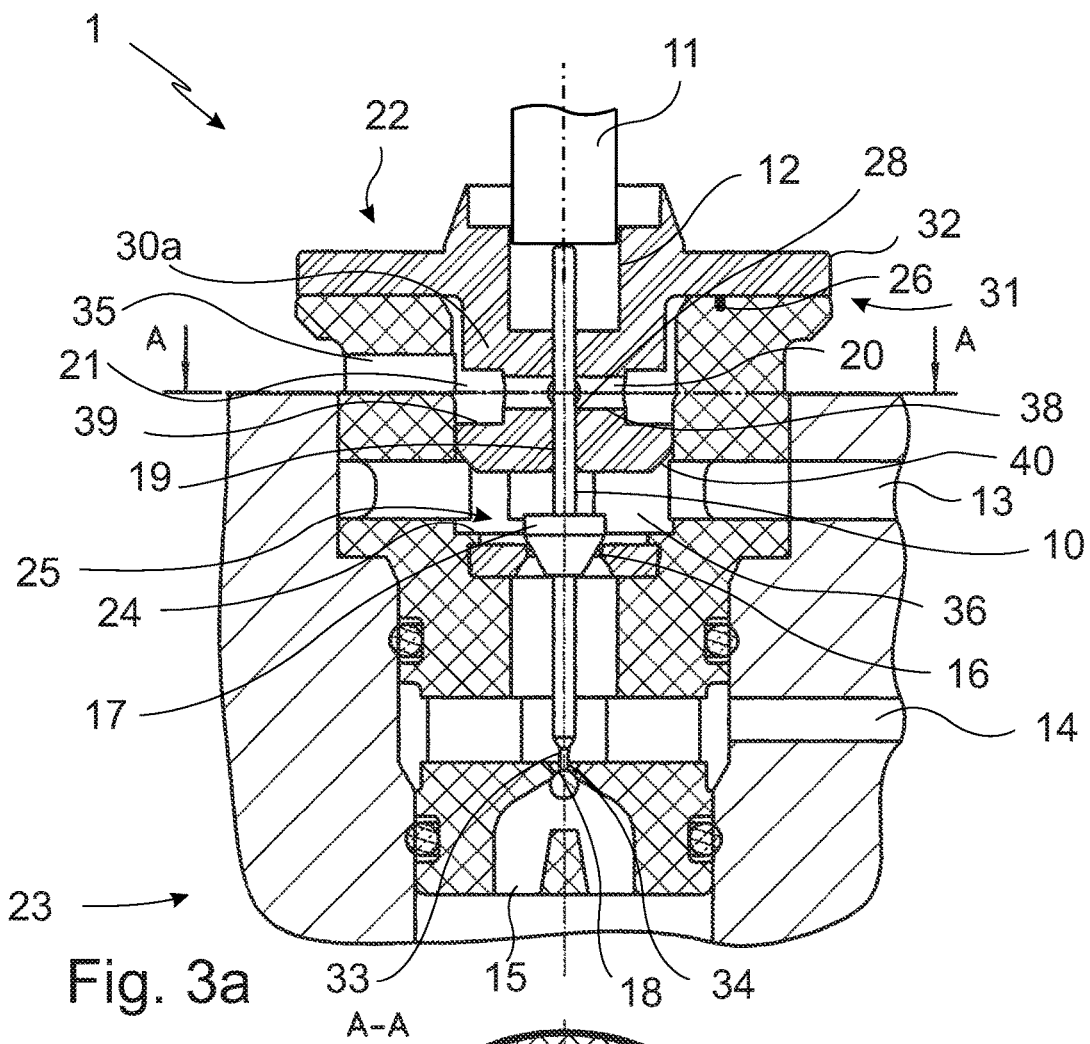

FIG. 3a shows an electromagnetic valve 1 already described in connection with FIG. 1. Here also a core 32 is provided. In contrast to FIG. 1, the core 32 in the embodiment of FIG. 3a consists of a single structural part. This is linked to the magnetic part 22 or is interlocked therewith positive locking. Alternatively, there is also the option of forming the core 32 in one piece from the magnetic part 22, and thus providing the core part section 30a projecting in the valve part 23 by the magnetic part 22 itself. In the embodiment of FIG. 3a, the core 32 or the core part section 30a provides the penetration bore hole 19. Furthermore, in the core part section 30a the connecting channels 20 are provided, through which the oil or oil particle mixture transported by the activation rod 10 is removed from the core part section 30a. In the embodiment, the core 32 has four connecting channels 20 altogether, that each extend radially to the penetration bore hole 19 in the core part section 30 crosslike. The connecting channels 20 end in a circumferential groove 39 in the core part section 30a. This groove again is in connection with a bore hole 35 serving as drainage, that provides a reservoir or drainage for the oil or oil particle mixture removed from the core part section 30a via the connecting channels or the circumferential groove 39. At the same time, this also widens the relieving area 21.

Figure 3B:
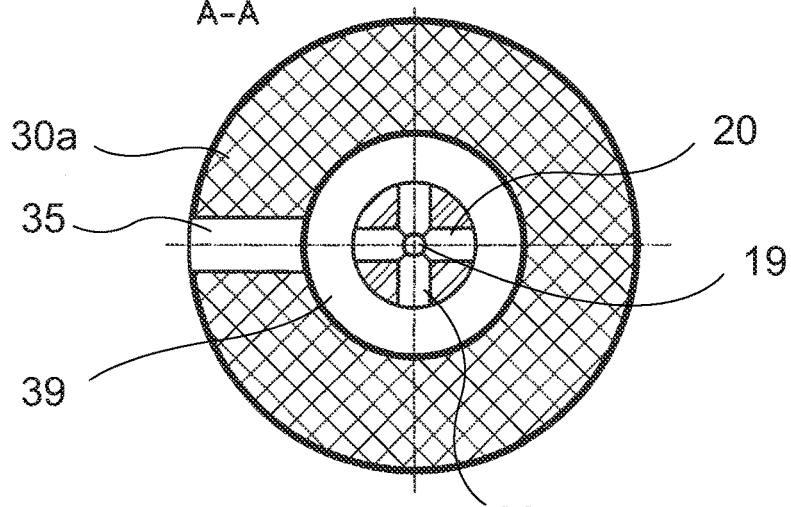
Figure 3C:
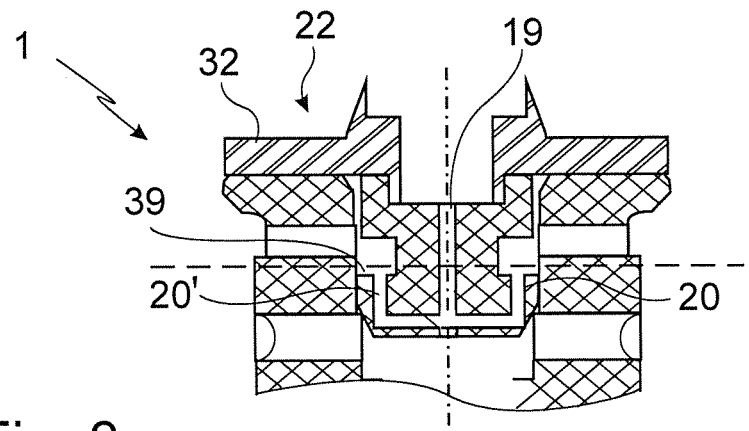
Figure 3D:
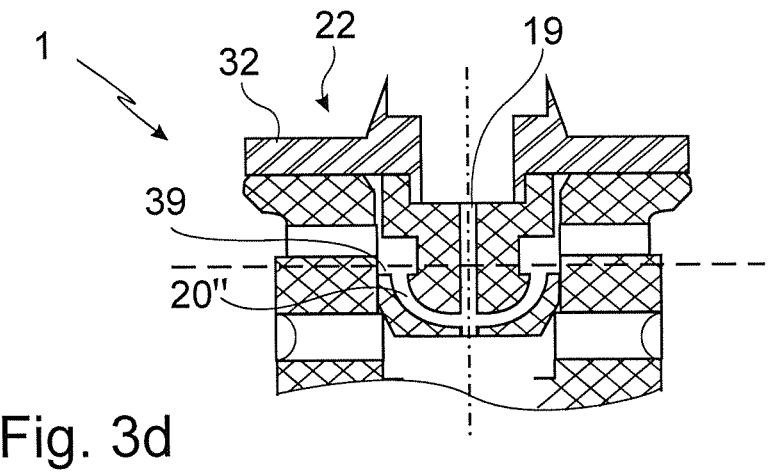
Figure 3E:
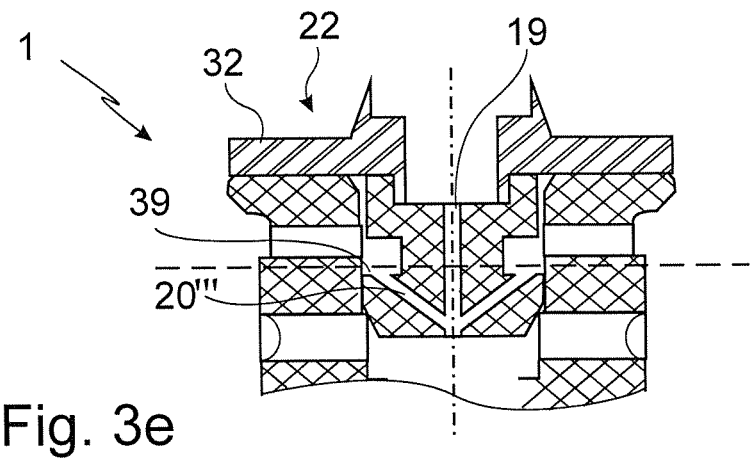

FIG. 3b shows a sectional representation through the core part section along the line A-A in FIG. 3a. The crosswise arranged connecting channels 20 with the penetration bore hole 19 in their central contact point can be seen clearly. The penetration bore hole 19 provides a guide and centering for the activation rod 10 in the electromagnetic valve. The connecting channels 20 join an annular groove 39, that is also provided in the core part section 30a. This groove 39 presents at the same time the relieving area 21 and serves as reservoir of the deposited oil and oil particle mixture drained through the connection channels 20. The annular groove 39 is in connection with the bore hole 35 provided in the valve part 23, that means in the section of the valve part 23 receiving the core part section 30a. Via the boring 35, the oil or oil particle mixture draining from the groove 39 can return.

Figure 4A:
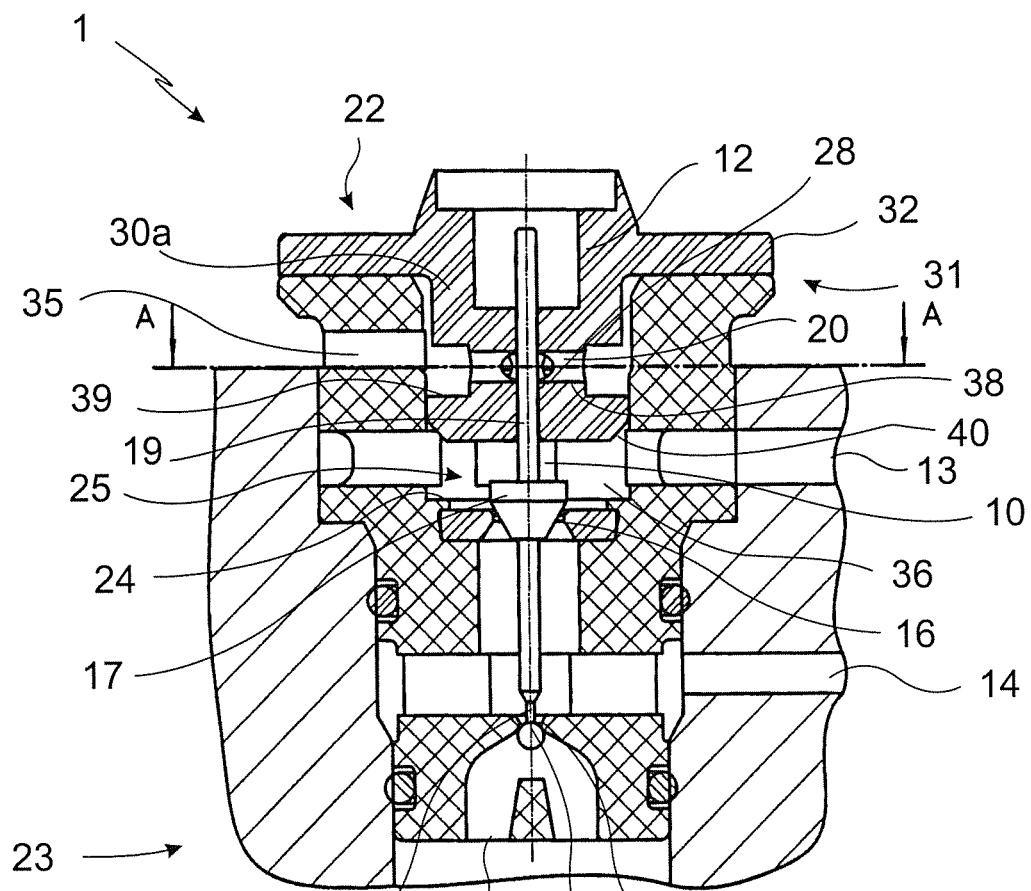
Figure 4B:
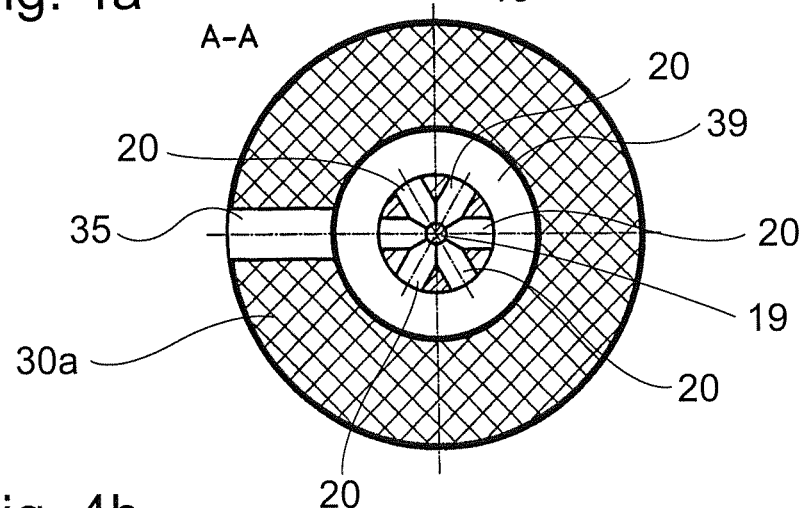

FIG. 4a shows another embodiment of the electromagnetic valve according to the invention. The functional elements are similar to the ones presented in the electromagnetic valves of FIG. 1 or 3a. A difference compared with FIG. 3a results in the geometry of the core part section 30a or the connecting channels 20 provided therein. In contrast to FIG. 3b, the connecting channels 20 are arranged here starlike and extend radially to the penetration bore hole 19 in the core part section 30a. The single connecting channels 20 are, as it can be seen in FIG. 4b, provided as acute or conically running bore holes. The ends of the connecting channels 20 form altogether the section of the penetration bore hole 19 provided in the core part section 30a in the area of the connecting channels 20. The embodiment shown in FIG. 4a has the advantage that immediately in the section of the core part section 30a that is characterized by the mouths of the connecting channels 20, a first widening of the penetration bore hole is formed. Therefore, the result is here already a first relieving area. Because of the geometry of the penetration bore hole 19 or the connecting channels 20 arranged radially thereto, at the same time oil or oil particle mixture that is carried along by the activation rod is wiped off. This is again removed via the connecting channels 20 that are connected with a circumferential annular groove 39. Transportation into the armature housing bore 12 is thus prevented effectively. In the embodiment of FIG. 4b or FIG. 4a a bore hole 35, providing a drainage for the oil or oil particle mixture collected in the groove 39, also joins the circumferential groove 39, and, when a certain filling degree of the groove 39 or the provided reservoir 21 is reached, the oil or oil particle mixture is returned in a return.

The core 32 or the core part section providing the connecting channels 20 and the groove 39 can also be provided as separate molded part. This molded part can be formed here of a material different from the magnetic part 22. For example, there is the option of producing the core 32 or the core part section 30a or a core part 30b, as presented in FIG. 1, from a plastic material or a mixture of plastic materials. The result is special advantages during manufacturing, as a plastic material of this kind can be produced, for example, in an injection molded process. During the production process already an exemplary geometry of the connecting channels 20, as presented in FIG. 3a or 4b, can be taken into account. A finishing of the core 32 or a core part section 30a or core part 30b is not required. Also a reduction of the circumference of the core 32 or the core part section 30a can be provided already during manufacturing, so that here a relieving area is formed when the core 32 is put in a valve part 23.

Besides the embodiment with a circumferential groove shown here, there is also the option that this circumferential groove 39 is deleted, and the connecting channels 20 end in the bore hole 35 or a circumference-reduced area of the valve housing or the valve part 23 immediately, and the deposited oil or oil particle mixture is drained from there in a return. The forming of a relieving area 21 is obtained here by reducing the circumference of the core 32, core part 30b or core part section 30a, or by reducing the material thickness in the area of the valve part 23 receiving the core 32.

The invention encompasses valves configured as pressure valves and proportional pressure valves without being restricted to these configurations.

Although the invention has been described in terms of specific embodiments which are set forth in considerable detail, it should be understood that this is by way of illustration only and that the invention is not necessarily limited thereto, since alternative embodiments and operating techniques will become apparent to those skilled in that art in view of the disclosure. Accordingly, modifications are contemplated which can be made without departing from the spirit of the described invention.

The invention claimed is:

1. Electromagnetic pressure valve comprising:
a magnetic part comprising:
at least one electrically controllable coil,
an armature provided in an armature housing bore, and
a core comprising:
a penetration bore hole and
at least one connecting channel, providing fluid communication between the penetration bore hole and at least one of a pressure-free relieving area and a pressure-reduced relieving area formed between the core and a recess in the valve, to reduce transmission of fluid into the armature housing bore via the penetration bore hole; and
a valve part comprising:
a feed in fluid communication with a pressurized consumer;
a return connection in fluid communication with a pressurized oil circuit;
at least one globe valve seat sealable by a locking part, the at least one globe valve seat disposed between the feed and the return connection; and
a consumer connection in fluid communication with the pressurized consumer and disposed between the feed and the return connection,
wherein the armature interacts with the locking part, via an activation rod operatively disposed through the penetration bore hole of the core and extended between the armature and the locking part.

2. Electromagnetic pressure valve according to claim 1, wherein the at least one connecting channel comprises a plurality of connecting channels that are structured and arranged to run radially towards the penetration bore hole.

3. Electromagnetic pressure valve according to claim 1, wherein the at least one connecting channel is arranged at least one of substantially right-angled, vertically, and radially.

4. Electromagnetic pressure valve according to claim 1, wherein at least one of the core and the magnetic part is formed of at least two parts, separated in an axial direction, and wherein radially running recesses provided in the at least two parts form the at least one connecting channel.

5. Electromagnetic pressure valve according to claim 1, wherein the activation rod has a two-part configuration such that a first activation rod part is in active communication with a second activation rod part, the first activation rod part operationally communicating with the locking part of the at least one globe valve seat, and the second activation rod part disposed through the penetration bore hole in the core.

6. Electromagnetic pressure valve according to claim 1, wherein the core is configured as a separate structural part providing the at least one connecting channel.

7. Electromagnetic pressure valve according to claim 6, wherein at least one of the magnetic part and a magnetic section includes at least one of a centering pin and a centering bore hole for a center assembly of the separate structural part.

8. Electromagnetic pressure valve according to claim 7, wherein the core and at least one of the magnetic part, a core part section, and a core part is formed of different materials, and wherein at least one of the core part section and the core part is at least one of formed of a plastic material and has a coating of a plastic material.

9. Electromagnetic pressure valve according to claim 1, wherein the at least one connecting channel is provided through the core or a part of the core, and having at least one of an angulation and a bend.

10. Electromagnetic pressure valve according to claim 1, wherein at least one of the core and the magnetic part includes at least one of a widening, a bore hole, a notch, and a recess in an area in communication with the at least one connecting channel.

11. Electromagnetic pressure valve according to claim 10, wherein at least one of the core and the magnetic part includes at least one of the widening, the bore hole, the notch, and the recess on a side opposite the penetration bore hole of the at least one connecting channel, and wherein each of the at least one connecting channel ends in at least one of the widening, the bore hole, the notch, and the recess.

12. Electromagnetic pressure valve according to claim 10, wherein at least one of the core and the magnetic part includes at least one of the widening, the bore hole, the notch, and the recess has on a side opposite the penetration bore hole of the at least one connecting channel, and wherein at least one of the widening, the bore hole, the notch, and the recess provides a receiving space for a mixture of at least one of oil and oil particles excreted in the at least one connecting channel.

13. Electromagnetic pressure valve according to claim 1, wherein the at least one connecting channel includes a groove provided in at least one of the core, the magnetic part, a housing receiving the core, and a housing receiving the magnetic part, and wherein the at least one connecting channel ends in the groove provided in at least one of the core, the magnetic part, the housing receiving the core, and the housing receiving the magnetic part, wherein the groove is in fluid communication with a drain.

14. Electromagnetic pressure valve according to claim 1, wherein the core has at least one of a core part and a core section, and wherein the at least one pressure-free relieving area and pressure-reduced relieving area is integrated into at least one of the core, the core part, and the core section and is at least one of formed and limited by the core.

15. Electromagnetic pressure valve according to claim 1, wherein the at least one pressure-free relieving area and pressure-reduced relieving area includes areas of circumference reduction of at least one of the core and the magnetic part.

16. Electromagnetic pressure valve according to claim 1, wherein the at least one of a receiving space for excreted oil and an oil-particle mixture, the pressure-free relieving area, and the pressure-reduced relieving area is provided in a section of a valve housing receiving at least one of the core and the magnetic part, and wherein the section of the valve housing includes at least one of a reduction of circumference and a reduction of material in an outlet area of the at least one connecting channel.

17. Electromagnetic pressure valve according to claim 1, wherein at least one of a globe valve and the at least one a globe valve seat includes a receiving area for at least one of the core, the magnetic part, a section of the core, and a section of the magnetic part projecting into at least one of the globe valve and the at least one globe valve seat.

18. Electromagnetic pressure valve according to claim 17, wherein between a bottom of the receiving area and at least one of the core, the magnetic part, the section of the core, and the section of the magnetic part projecting into at least one of the globe valve and the at least one globe valve seat, a space is provided to provide a return for at least one of oil and an oil-particle mixture drained via a drainage and the at least one connecting channel.

19. Electromagnetic pressure valve according to claim 1, wherein the at least one connecting channel comprises a plurality of connecting channels that are structured and arranged in at least one of opposite, crosswise, and radially having an angle between 0 degrees and 90 degrees between adjacent connecting channels.

20. Electromagnetic pressure valve according to claim 1, wherein the at least one connecting channel is inclined relative to the penetration bore hole.

21. Electromagnetic pressure valve according to claim 1, wherein at least one of the core and the magnetic part is formed of at least two parts, separated in an axial direction, and wherein the at least one connecting channel is integrated into the at least two parts.

22. Electromagnetic pressure valve according to claim 8, wherein the plastic material is selected from the group consisting of a temperature-resistant plastic material, an acid-resistant plastic material, an oil-resistant plastic material, polyphenylene sulfide, polyamide, polytetrafluoroethylene, polychlortrifluor ethylene, and mixtures thereof.

23. Electromagnetic pressure valve according to claim 10, wherein at least one of the widening, the bore hole, the notch, and the recess has a volume that is enlarged compared with the at least one connecting channel.

24. Electromagnetic pressure valve according to claim 15, wherein the at least one pressure-free relieving area and pressure-reduced relieving area comprises a circular or substantially circular circumferential groove that is formed in the areas of circumferential reduction of at least one of the core and the magnetic part.

25. Electromagnetic pressure valve comprising:
a magnetic part comprising:
at least one electrically controllable coil,
an armature provided in an armature housing bore, and
a core comprising:
a penetration bore hole and
at least one connecting channel, providing fluid communication between the penetration bore hole and at least one of a pressure-free relieving area and a pressure-reduced relieving area formed between the core and a recess in the valve, to reduce transmission of fluid into the armature housing bore via the penetration bore hole; and
a valve part comprising:
a feed in fluid communication with a pressurized consumer;
a return connection in fluid communication with a pressurized oil circuit;
at least one globe valve seat sealable by a locking part, the at least one globe valve seat disposed between the feed and the return connection; and
a consumer connection in fluid communication with the pressurized consumer and disposed between the feed and the return connection,
wherein the armature interacts with the locking part, via an activation rod operatively disposed through the penetration bore hole of the core and extended between the armature and the locking part, and
wherein the at least one connecting channel is oriented radially with respect to the penetration bore hole, forming an annular edge with the penetration bore hole to wipe off oil adhering to the activation rod.

* * * * *